United States Patent
Cui et al.

(10) Patent No.: US 12,484,204 B2
(45) Date of Patent: Nov. 25, 2025

(54) DISPLAY MODULE, DISPLAY DEVICE AND HEAT DISSIPATION ASSEMBLY

(71) Applicants: Chengdu BOE Optoelectronics Technology Co., Ltd., Sichuan (CN); BOE Technology Group Co., Ltd., Beijing (CN)

(72) Inventors: Zhihong Cui, Beijing (CN); Binfeng Feng, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 363 days.

(21) Appl. No.: 18/246,368

(22) PCT Filed: Nov. 18, 2021

(86) PCT No.: PCT/CN2021/131395
§ 371 (c)(1),
(2) Date: Mar. 23, 2023

(87) PCT Pub. No.: WO2022/116843
PCT Pub. Date: Jun. 9, 2022

(65) Prior Publication Data
US 2023/0371217 A1    Nov. 16, 2023

(30) Foreign Application Priority Data

Dec. 1, 2020 (CN) .................... 202011388298.X

(51) Int. Cl.
*H05K 7/20* (2006.01)
*H05K 1/18* (2006.01)
*H05K 9/00* (2006.01)

(52) U.S. Cl.
CPC ......... *H05K 7/20954* (2013.01); *H05K 1/189* (2013.01); *H05K 9/0081* (2013.01)

(58) Field of Classification Search
None
See application file for complete search history.

(56) References Cited

FOREIGN PATENT DOCUMENTS

| CN | 205071568 U | 3/2016 |
|---|---|---|
| CN | 106413335 A | 2/2017 |

(Continued)

OTHER PUBLICATIONS

Written Opinion from PCT/CN2021/131395 dated Jan. 26, 2022.
International Search Report from PCT/CN2021/131395 dated Jan. 26, 2022.

*Primary Examiner* — James Wu
*Assistant Examiner* — Christopher L Augustin
(74) *Attorney, Agent, or Firm* — Calfee, Halter & Griswold LLP

(57) ABSTRACT

A display module, display device and heat dissipation assembly are provided. The display module includes a display panel and a heat dissipation structure. The heat dissipation structure includes an adhesive layer adhered to a back side of the display panel, a first foam layer located on a side of the adhesive layer away from the display panel, a heat dissipation layer located on a side of the first foam layer away from the adhesive layer, and a second foam layer located on a side of the heat dissipation layer away from the first foam layer. The second foam layer has a plurality of missing avoidance areas.

20 Claims, 6 Drawing Sheets

(56) References Cited

FOREIGN PATENT DOCUMENTS

| | | | | | |
|---|---|---|---|---|---|
| CN | 106850894 | A | | 6/2017 | |
| CN | 106954370 | A | | 7/2017 | |
| CN | 207008995 | U | | 2/2018 | |
| CN | 207781603 | U | * | 8/2018 | |
| CN | 208485836 | U | | 2/2019 | |
| CN | 109493748 | A | | 3/2019 | |
| CN | 109903680 | A | * | 6/2019 | |
| CN | 109105547 | U | | 7/2019 | |
| CN | 209105547 | U | | 7/2019 | |
| CN | 110446406 | A | | 11/2019 | |
| CN | 110767092 | A | | 2/2020 | |
| CN | 210725882 | U | | 6/2020 | |
| CN | 111766970 | A | | 10/2020 | |
| CN | 111808544 | A | * | 10/2020 | C09J 7/29 |
| CN | 111849372 | A | | 10/2020 | |
| CN | 214705246 | U | | 11/2021 | |
| JP | H07211454 | H | | 8/1995 | |
| JP | 2939523 | B2 | | 8/1999 | |

* cited by examiner

DISPLAY MODULE, DISPLAY DEVICE AND HEAT DISSIPATION ASSEMBLY

CROSS-REFERENCE TO RELATED APPLICATIONS

The present disclosure is a U.S. National Stage of International Application No. PCT/CN2021/131395 filed on Nov. 18, 2021, which claims the priority to Chinese Patent Application No. 202011388298.X, titled "DISPLAY MODULE, DISPLAY DEVICE AND HEAT DISSIPATION ASSEMBLY" filed on Dec. 1, 2020, the entire contents thereof are incorporated herein by reference.

TECHNICAL FIELD

The present disclosure relates to the field of display technology, and in particular, to a display module, display device and heat dissipation assembly.

BACKGROUND

At present, a foldable display product is rapidly emerging. For example, a display product such as a mobile phone with a folding function can be applied to a variety of use scenarios. However, the foldable display product, in particular a middle frame structure thereof, has a complex structure, therefore the assembling of a structure such as a display module with the middle frame structure is time-consuming and laboursome. In addition, the display module, when being assembled, is prone to die marks and is also prone to collision and extrusion with the middle frame structure, resulting in easy damage and other situations of the display module, which affecting the reliability of the product.

It should be noted that the information disclosed in the above background section is only for enhancement of understanding of the background of the present disclosure, and therefore may contain information that does not form the prior art that is already known to a person skilled in the art.

SUMMARY

The present disclosure relates to a display module, display device and heat dissipation assembly.

A first aspect of the present disclosure provides a display module, including:
  a display panel; and
  a heat dissipation structure, including an adhesive layer adhered to a back side of the display panel, a first foam layer located on a side of the adhesive layer away from the display panel, a heat dissipation layer located on a side of the first foam layer away from the adhesive layer, and a second foam layer located on a side of the heat dissipation layer away from the first foam layer, wherein the second foam layer has a plurality of missing avoidance areas.

In an exemplary embodiment of the present disclosure, the heat dissipation layer includes a metallic aluminum film and an RF shielding film, the metallic aluminum film has a first side away from the second foam layer and a second side close to the second foam layer, and the RF shielding film is disposed on at least one of the first side and the second side.

In an exemplary embodiment of the present disclosure, the RF shielding film is disposed on the second side of the metallic aluminum film.

In an exemplary embodiment of the present disclosure, the RF shielding film is a metallic nickel film.

In an exemplary embodiment of the present disclosure, the heat dissipation layer has a thickness of 40 μm to 60 μm.

In an exemplary embodiment of the present disclosure, the display panel is flexible and includes a display part, a bonding part located on a back side of the display part and a bending part connecting the display part to the bonding part, the adhesive layer is adhered to the back side of the display part, the plurality of missing avoidance areas include at least a first missing avoidance area, and the bonding part is located in the first missing avoidance area.

In an exemplary embodiment of the present disclosure, the plurality of missing avoidance areas further includes a second missing avoidance area, and the second missing avoidance area is contiguous with the first missing avoidance area, the display module further including a chip-on-film (COF) and a main flexible circuit board, the main flexible circuit board is located in the second missing avoidance area, a part of the COF is located in the first missing avoidance area and electrically connected to the bonding part, and another part of the COF is located in the second missing avoidance area and electrically connected to the main flexible circuit board.

In an exemplary embodiment of the present disclosure, the plurality of missing avoidance areas further includes a third missing avoidance area for accommodating a middle frame-grounded structure and a fourth missing avoidance area for accommodating a camera.

In an exemplary embodiment of the present disclosure, a ratio between a of the second foam layer and a thickness of the heat dissipation structure is from 0.4 to 0.6.

In an exemplary embodiment of the present disclosure, the thickness of the second foam layer is from 0.1 mm to 0.3 mm.

A second aspect of the present disclosure provides a display device, including
  a middle frame structure, having a mounting plate and a side plate coupled to the mounting plate, the side plate and the mounting plate form a mounting groove by surrounding the mounting groove; and
  a display module according to any one of the above claims, mounted in the mounting groove, wherein the second foam layer is mounted to face the mounting plate.

A third aspect of the present disclosure provides a heat dissipation assembly, including:
  a heat dissipation structure, including an adhesive layer which can be adhered to a back side of a display panel, a first foam layer located on a side of the adhesive layer away from the display panel, a heat dissipation layer located on a side of the first foam layer away from the adhesive layer, and a second foam layer located on a side of the heat dissipation layer away from the first foam layer, wherein the second foam layer has a plurality of missing avoidance areas;
  a plurality of filling parts, each filling in one of the missing avoidance areas, wherein the filling part is adhered to the heat dissipation layer, and a plane of the filling part away from the display panel is flush with a plane of the second foam layer away from the display panel; and
  a protective film layer, located on a side of each of the second foam layer and the filling parts away from the heat dissipation layer and completely covering the heat dissipation structure.

In an exemplary embodiment of the present disclosure, the filling part has a same elastic modulus as the second foam layer.

In an exemplary embodiment of the present disclosure, the protective film layer is adhered to the filling part, and an adhesion stress between the protective film layer and the filling part is greater than an adhesion stress between the filling part and the heat dissipation layer.

In an exemplary embodiment of the present disclosure, the plurality of missing avoidance areas includes a first missing avoidance area, a second missing avoidance area, a third missing avoidance area and a fourth missing avoidance area, and the protective film layer includes a first protective part, a second protective part and a third protective part, the first protective part completely covers the first missing avoidance area, the second protective part completely covers the second missing avoidance area, and the third protective part completely covers the third missing avoidance area and the fourth missing avoidance area.

It is to be understood that the foregoing general description and the following detailed description are exemplary and explanatory only and are not restrictive of the present disclosure.

BRIEF DESCRIPTION OF THE DRAWINGS

The accompanying drawings herein, which are incorporated in and constitute a part of this specification, illustrate embodiments consistent with the present disclosure, and together with the description serve to explain the principle of the present disclosure. Obviously, the drawings in the following description are only some embodiments of the present disclosure, and for a person skilled in the art, other drawings may also be obtained from these drawings without creative effort.

DETAILED DESCRIPTION

Figure 1:
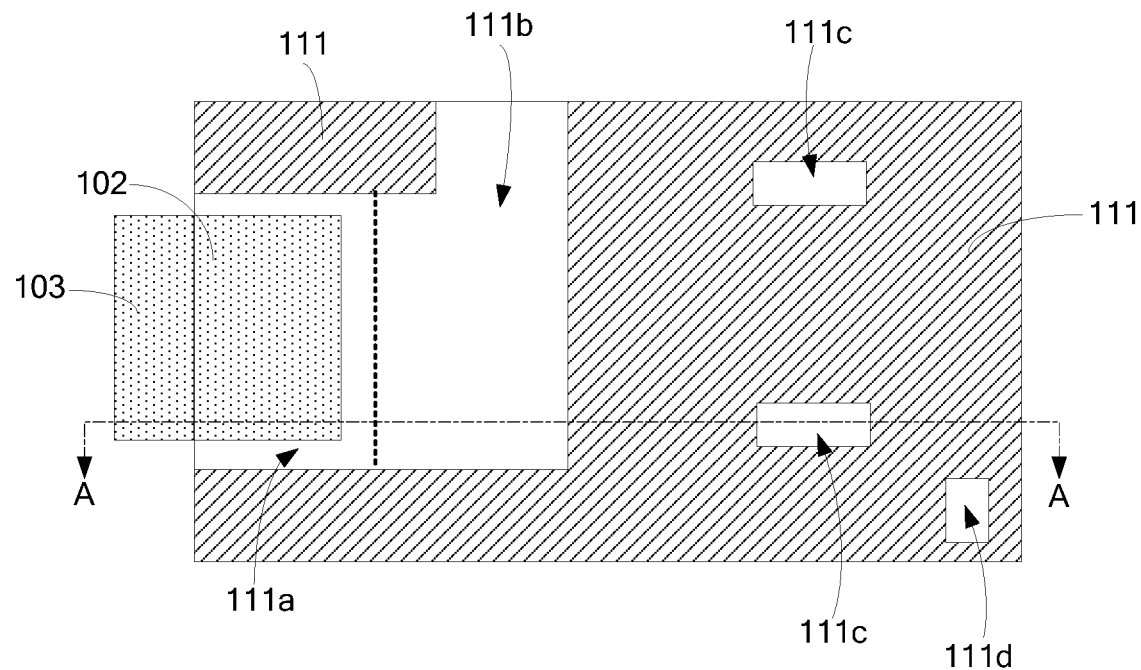
FIG. 1 illustrates a schematic plan view of a back side of a display module in an embodiment of the present disclosure.

In order to make the object, technical solution and advantage of the present disclosure more clearly understood, embodiments of the present disclosure will be described in detail below in conjunction with the accompanying drawings. It is noted that the embodiment may be implemented in a number of different forms. A person skilled in the art can readily appreciate the fact that the manner and content can be transformed into a variety of forms without departing from the purpose of the present disclosure and the scope thereof. Accordingly, the present disclosure should not be construed as being limited only to what is recited in the following embodiments. The embodiments and the features in the embodiments of the present disclosure may be arbitrarily combined with each other without conflict.

In the accompanying drawings, a size of constituent element, a thickness of layer or an area are sometimes exaggerated for the sake of clarity. Accordingly, an implantation of the present disclosure is not necessarily limited to that size, and the shape and size of each component in the accompanying drawings do not reflect true proportions. Furthermore, the accompanying drawings schematically illustrate ideal examples, and an implementation of the present disclosure is not limited to the shape or value shown in the accompanying drawings.

It should be noted that the term "on . . . " as used herein may mean that a layer is formed or provided directly on another layer, or that a layer is formed or provided indirectly on another layer, i.e., that there is an additional layer between the two layers.

The terms "a", "this", "the" are used to indicate the presence of one or more elements/components/etc.; and the term "including" is used to indicate an open-ended inclusive meaning and refers to that additional elements/components/etc. may be present in addition to the listed elements/components/etc.

Ordinal words such as "first" and "second" in this specification are provided to avoid confusion of constituent elements and are not intended to define the number.

In this specification, the term "connect" is to be understood in a broad sense, unless otherwise expressly specified and defined. For example, it may be a fixed connection, or a removable connection, or an integral connection; it may be a mechanical connection or an electrical connection; it may be a direct connection, or an indirect connection via an intermediate element, or a connection within two components. For a person skilled in the art, the specific meaning of the above term in the context of the present disclosure may be understood according to the specific cases.

An embodiment of the present disclosure provides a display module. The display module may be used in a foldable display product. However the present disclosure is not limited thereto, and the display module may be also used in a non-foldable display product. Specifically, as described with reference to FIGS. 1 and 2, the display module may include a display panel 10 and a heat dissipation structure 11. The heat dissipation structure 11 may be located on a back side of the display panel 10 for improving a heat dissipation efficiency of the display panel 10, so that a service life of the display panel 10 may be extended.

Figure 2:
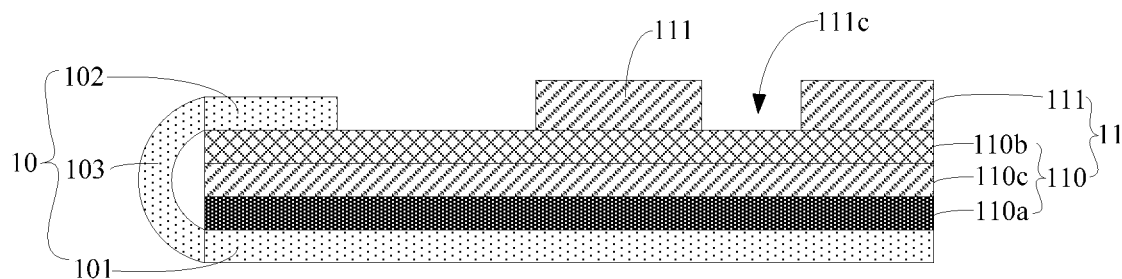
FIG. 2 illustrates a schematic cross-sectional view of the display module shown in FIG. 1 along line A-A.

In an embodiment of the present disclosure, as shown in FIG. 2, the heat dissipation structure 11 may be a multi-layer structure, which may include an adhesive layer 110a, a heat dissipation layer 110b and a first foam layer 110c located between the adhesive layer 110a and the heat dissipation layer 110b. The structure including the adhesive layer 110a, the heat dissipation layer 110b and the first foam layer 110c may be defined as a heat dissipation stack 110. In an embodiment of the present disclosure, the adhesive layer 110a is adhered to the back side of the display panel 10, so that the entire heat dissipation structure 11 is adhered to the back side of the display panel 10. The heat dissipation layer 110b is configured to quickly dissipate the heat generated when the display panel 10 operates. The first foam layer 110c is sandwiched between the heat dissipation layer 110b and the adhesive layer 110a, and may have a cushioning effect during the process of fitting the heat dissipation structure 11 to the display panel 10 to protect the display panel 10.

It should be understood that the adhesive layer 110a, the heat dissipation layer 110b and the first foam layer 110c are provided on the entire surface, i.e., the adhesive layer 110a, the heat dissipation layer 110b and the first foam layer 110c do not have an area in which a material is missing.

It should be noted that in an embodiment of the present disclosure, the heat dissipation structure 11 not only includes the aforementioned heat dissipation stack 110, but also includes a second foam layer 111 located on a side of the heat dissipation layer 110b away from the first foam layer 110c. When the display module having the heat dissipation structure 11 is assembled with a middle frame, the foam layer (i.e., the second foam layer 111) further disposed on the side of the heat dissipation structure 11 away from the display panel 10 may provide a cushioning effect, thereby preventing the damage caused by collision and extrusion with the middle frame structure, thus solving the problem such as fragmented bright spots and die marks generated during assembling and improving a product reliability.

Further, it should be noted that in an embodiment of the present disclosure, the second foam layer 111 has a plurality of missing avoidance areas that may avoid parts of the middle frame structure or other structures. For example, the display panel 10 may be flexible, and may include a display part 101, a bonding part 102 located on a back side of the display part 101, and a bending part 103 connecting the display part 101 to the bonding part 102. The display part 101 may be an OLED (Organic Light Emitting Diode) display. The adhesive layer 110a of the heat dissipation structure 11 may be adhered to the back side of the display part 101. It may be understood that an outer contour of the heat dissipation structure 11 coincides with or is located outside an outer contour of the display part 101, thereby preventing the case where the die mark may be generated during the fitting of the heat dissipation structure 11 to the display part 101.

Specifically, the plurality of missing avoidance areas of the second foam layer 111 in the heat dissipation structure 11 may include at least a first missing avoidance area 111a, which is configured to avoid the bonding part 102 of the display panel 10, as shown in FIG. 1. That is, the bonding part 102 of the display panel 10 may be located in the first missing avoidance area 111a. It should be noted that a thickness of the bonding part 102 may be greater than a thickness of the second foam layer 111, may be less than the thickness of the second foam layer 111, or may be equal to the thickness of the second foam layer 111, which depends on the circumstances. When the thickness of the bonding part 102 is greater than or equal to the thickness of the second foam layer 111, an avoidance area corresponding to the bonding part 102 may be disposed on the middle frame structure, so as to avoid interference between the bonding part 102 and the middle frame structure during a assembling process.

For example, when the bonding part 102 of the display panel 10 is located in the first missing avoidance area 111a, as shown in FIGS. 1 and 2, there may be a gap between the bonding part 102 of the display panel 10 and the second foam layer 111, in order to avoid a situation where the bonding part 102 exerts friction or pressure on the second foam layer 111 during a bending process, resulting in a die mark on the display part 101.

Figure 12:
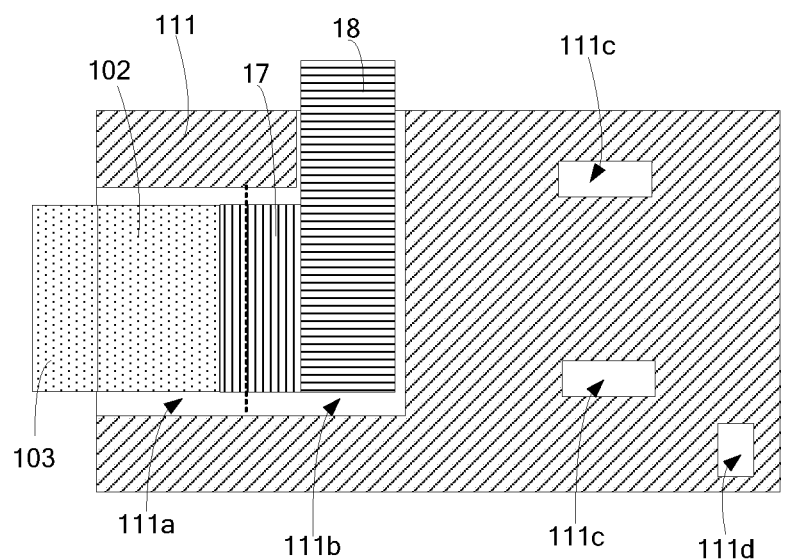
FIG. 12 illustrates a schematic plan view after completion of step S4009 in an embodiment.

In an embodiment of the present disclosure, as shown in FIG. 12, the display module may further include a chip-on-film (COF) 17 and a main flexible circuit board 18. A part of the COF 17 may be electrically connected to the bonding part 102 and another part thereof may be electrically connected to the main flexible circuit board 18. In order to achieve avoidance of the COF 17 and the main flexible circuit board 18, as shown in FIG. 12, the plurality of missing avoidance areas of the second foam layer 111 in the heat dissipation structure 11 may further include a second missing avoidance area 111b, and the main flexible circuit board 18 may be located in the second missing avoidance area 111b. It should be understood that the part of the COF 17 electrically connected to the bonding part 102 may be located in the first missing avoidance area 111a and the part of the COF 17 electrically connected to the main flexible circuit board 18 may be located in the second missing avoidance area 111b. For example, the second missing avoidance area 111b may be contiguous with the first missing avoidance area 111a.

For example, when the COF 17 is located in the first missing avoidance area 111a and the second missing avoidance area 111b, there may be a gap between the COF 17 and the second foam layer 111. When the main flexible circuit board 18 is located in the second missing avoidance area 111b, there may be a gape between the main flexible circuit board 18 and the second foam layer 111. Such design may prevent the COF 17 and the main flexible circuit board 18 from exerting friction or pressure on the second foam layer 111 to cause the die mark on the display part 101 when assembling the COF 17 and the main flexible circuit board 18.

It should be noted that the thickness of the COF 17 and the main flexible circuit board 18 may be greater than the thickness of the second foam layer 111, may be less than the thickness of the second foam layer 111, or may be equal to the thickness of the second foam layer 111, which depends on the circumstances. When the thickness of the COF 17 and the main flexible circuit board 18 is greater than or equal to the thickness of the second foam layer 111, the middle frame structure may be provided with avoidance areas thereon corresponding to the COF 17 and the main flexible circuit board 18 to avoid interference between the COF 17 and the main flexible circuit board 18 with the middle frame structure during the assembling process.

Figure 3:
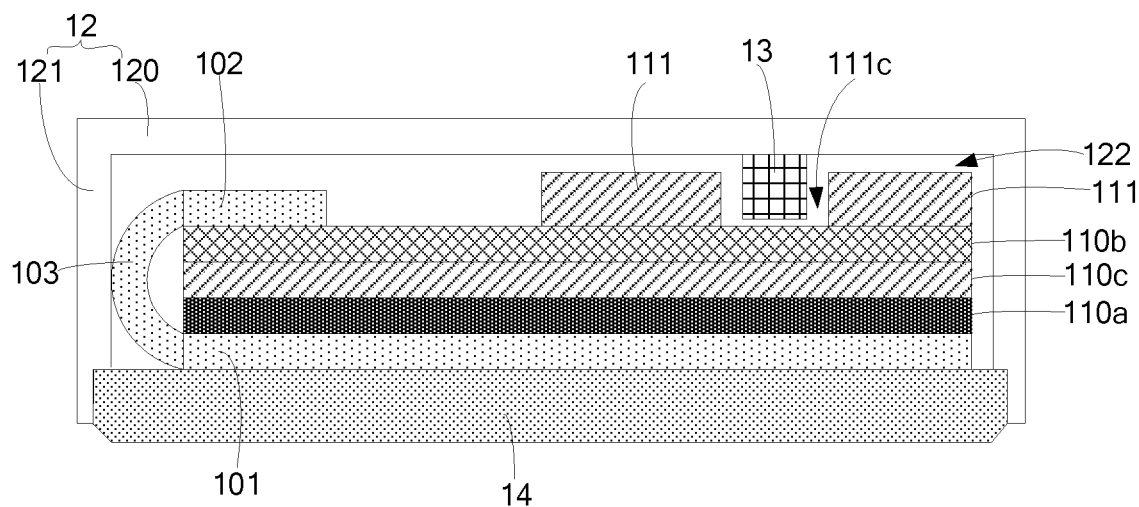
FIG. 3 illustrates a schematic cross-sectional view of a display device in an embodiment of the present disclosure.

In addition, as shown in FIGS. 1 and 12, the plurality of missing avoidance areas may further include a third missing avoidance area 111c and a fourth missing avoidance area 111d. The third missing avoidance area 111c is used to accommodate a middle frame-grounded structure 13 (as shown in FIG. 3), and the fourth missing avoidance area 111d is used to accommodate a camera (not shown in the figures). However the present disclosure is not limited thereto, the plurality of missing avoidance areas may further include other missing avoidance areas, which depends on a specific product.

For example, when the middle frame-grounded structure 13 is located in the third missing avoidance area 111c, there may be a gap between the middle frame-grounded structure 13 and the second foam layer 111. When the camera is located in the fourth missing avoidance area 111d, there may be a gap between the camera and the second foam layer 111. Such design may prevent the COF and the main flexible circuit board from exerting friction or pressure on the second foam layer 111 to cause the die mark on the display part 101 when assembling the COF and the main flexible circuit board.

Based on the foregoing, in the embodiment of the present disclosure, the plurality of missing avoidance areas are disposed on the second foam layer 111 in the heat dissipation structure 11, so that the product thickness may be easily reduced while improving the product reliability, which facilitates the thinning of the product and the cost reduction.

It should be noted that the missing avoidance area of the second foam layer 111 mentioned in the embodiment of the present disclosure refers to an area in the second foam layer 111 where no foam material is provided. The missing avoidance area may divide the second foam layer 111 into a plurality of mutually independent parts, as shown in FIG. 1. However the present disclosure is not limited thereto, and the second foam layer 111 may also be a whole.

In an embodiment of the present disclosure, a ratio between the thickness of the second foam layer 111 in the heat dissipation structure 11 and the thickness of the heat dissipation structure 11 may be 0.4 to 0.6, e.g., 0.4, 0.5, 0.6 and the like. In such design, the heat dissipation structure 11 as a whole may have a better cushioning effect, and can also facilitate the thinning of the product and the cost reduction.

For example, the thickness of the second foam layer may be 0.1 mm to 0.3 mm, e.g., 0.1 mm, 0.2 mm, 0.3 mm, and the like. For example, the thickness of the second foam layer 111 is approximately 0.2 mm, and in this case, the thickness of the heat dissipation structure 11 of the present disclosure may be approximately 0.4 mm. However the present disclosure is not limited thereto, it depends on the circumstances.

It should be noted that the thickness of the second foam layer 111 mentioned above is the thickness of the second foam layer 111 in the area where the foam material is formed (i.e., the foam area of the second foam layer 111), and furthermore, the second foam layer 111 is adhered to the heat dissipation layer 110b by means of adhesive material. Therefore, the thickness of the second foam layer 111 in the foam area refers to the thickness in the foam area with the adhesive material. The thickness of the adhesive material in the foam area may be smaller than the thickness of the foam material, as long as it can ensure the adhesion stability between the second foam layer 111 and the heat dissipation layer 110b. The thickness of the foam material in the second foam layer 111 is the same in all areas of the second foam layer 111. The aforementioned thickness of the heat dissipation structure 11 is the thickness of the heat dissipation structure 11 in the area corresponding to the foam area of the second foam layer 111.

In an embodiment of the present disclosure, the heat dissipation layer 110b in the heat dissipation structure 11 may include a metallic aluminum film and an RF shielding film, the metallic aluminum film may have a first side away from the second foam layer 111 and a second side close to the second foam layer 111, and at least one of the first side and the second side is provided with the RF shielding film thereon. In an embodiment of the present disclosure, the RF shielding film is disposed on the second side of the metallic aluminum film.

In the embodiment, by using aluminum material as the heat dissipation body of the heat dissipation structure 11, good heat dissipation performance may be achieved and at the same time, the weight of the heat dissipation structure 11 may be reduced. Further, by providing the RF shielding film on at least one side of the metallic aluminum film, the shielding of RF information of the product may be improved.

For example, the RF shielding film may be a metallic nickel film, i.e., the metallic nickel film for RF shielding is formed by plating nickel on one side of the metallic aluminum film.

In an embodiment of the present disclosure, an overall thickness of the heat dissipation layer 110b may be 40 μm to 60 μm, for example, 40 μm, 45 μm, 50 μm, 55 μm, 60 μm, and the like. It should be noted that the heat dissipation layer 110b is adhered to the first foam layer 110c, and therefore the overall thickness of the heat dissipation layer 110b mentioned herein is the thickness of the heat dissipation layer 110b with the adhesive material.

An embodiment of the present disclosure also provides a display device, as shown in FIG. 3, which may include a middle frame structure 12 and a display module, the middle frame structure 12 has a mounting plate 120 and a side plate 121 connected to the mounting plate 120, and the side plate 121 and the mounting plate 120 form a mounting groove 122 by surrounding the mounting groove. The display module may be the module structure as described in any of the preceding embodiments, which will not be described in detail herein. The display module may be mounted in the mounting groove 122 of the middle frame structure 12. When the display module is mounted in the mounting groove 122, the second foam layer 111 in the display module faces the mounting plate 120 of the middle frame structure 12. It should be noted that the second foam layer 111 and the mounting plate 120 may have a certain gap therebetween to meet the design requirements.

In an embodiment of the present disclosure, the middle frame structure 12 may be provided with a middle frame-grounded structure 13 thereon, the area on the second foam layer 111 corresponding to the middle frame-grounded structure 13 is a missing avoidance area (i.e., the previously mentioned third missing avoidance area 111c) for avoiding the middle frame-grounded structure 13.

In an embodiment of the present disclosure, the display device may be a foldable display device. In order to make the display device foldable, the middle frame structure 12 is usually designed as a foldable structure, which makes the design of the middle frame structure 12 more complicated. Therefore, in order to prevent the damage of the display module when being assembled with the middle frame structure 12, in an embodiment of the present disclosure, the second foam layer 111 is further disposed on the side of the heat dissipation structure 11 of the display module away from the display panel 10. The second foam layer 111 may provide a cushioning effect, thereby preventing the damage caused by collision and extrusion with the middle frame structure 12, thus solving the problem such as fragmented bright spots and die marks generated during assembling and improving a product reliability.

In addition, in view of the complexity of the middle frame structure 12, the second foam layer 111 is designed to be provided with a plurality of missing avoidance areas to avoid some areas of the middle frame structure 12 or other structures, which can improve product reliability, reduce the thickness of the product and thus facilitate the thinness of the product, and further reduce costs.

As shown in FIG. 3, in an embodiment of the present disclosure, the foldable display device may further include a cover 14, which is located on the display side of the display module, i.e., on the side of the display panel 10 away from the heat dissipation structure 11. In an embodiment of the present disclosure, the edge of the cover plate 14 may extend beyond the edge of the display module and is attached onto the side plate 121 of the middle frame. It should be noted that the structure formed by the cover plate 14 and the display module fitted together for displaying may be defined as a display.

In an embodiment, the foldable display device may include one display screen as described above, which has a foldable ability, such that the foldable display device may be folded inwards or outwards. When the foldable display device is folded inwards, the display screen is located on the inside of the folded structure, in this case the user cannot operate the display screen. When the foldable display device is folded outwards, the display screen is located on the outside of the folded structure, in this case the user can operate the display screen.

In another embodiment, the foldable display device may include two display screens as described in any of the preceding embodiments, for example, a primary display screen located on the inside of the folded structure and a secondary display located on the outside of the folded structure. The secondary display screen may have an area of about half the area of the primary display screen. Specifically, the foldable display device is usually an in-folding product, i.e., when the foldable display device is in a folded state, the primary display is located on the inside of the folded structure and is in a folded state, the secondary display screen is located on the outside of the folded structure, and the user may operate with the secondary display screen. In addition, when the foldable display is in in an unfolded state, the primary display screen is also unfolded, which has a larger display area, and the user usually operates with the primary display screen.

An embodiment of the present disclosure provides a heat dissipation assembly including the heat dissipation structure 11 in the heat dissipation module described in any of the preceding embodiments, which will not be described in detail herein. However the present disclosure is not limited thereto, and the heat dissipation assembly may further include a plurality of filling parts 15 and a protective film layer 16. Each of the plurality of filing parts 15 is filled within a missing avoidance area of the heat dissipation structure 11, and the filling parts 15 are adhered to the heat dissipation layer 110b of the heat dissipation structure 11. A plane of the filling part 15 away from the display panel 10 is flush with a plane of the second foam layer 111 of the heat dissipation structure 11 away from the display panel 10. The protective film layer 16 may be located on the side of each of the filling parts 15 and the second foam layer 111 away from the heat dissipation layer 110b and completely covers the heat dissipation structure 11.

In an embodiment of the present disclosure, an elastic modulus of the filling part 15 may be the same as an elastic modulus of the second foam layer 111, so that during the process of fitting the heat dissipation assembly to the display panel 10, the elastic deformation of the heat dissipation assembly may be the same at each position to ensure that the display panel 10 is subjected to uniform pressure at each position to avoid die marks generated during the fitting.

Figure 6:
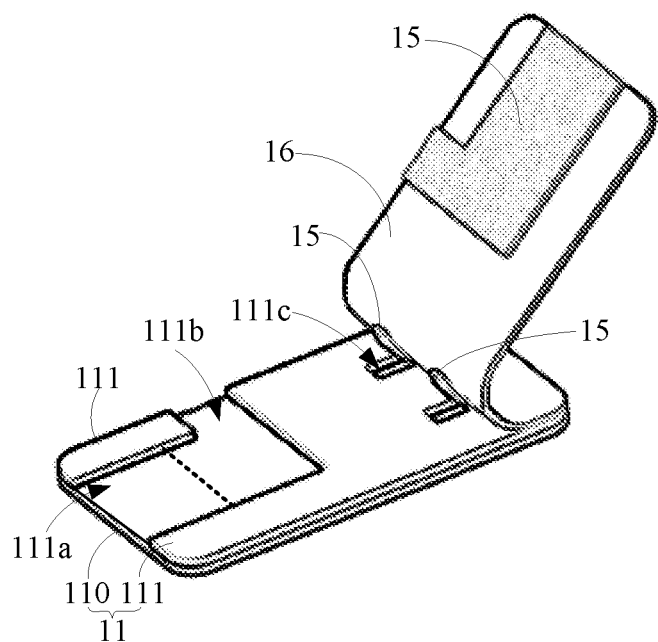
FIG. 6 illustrates a schematic diagram of a process of removing a protective film layer and a filling part from a heat dissipation structure in an embodiment of the present disclosure.

In an embodiment of the present disclosure, the protective film layer 16 is adhered to the filling part 15, and an adhesion stress between the protective film layer 16 and the filling part 15 is greater than an adhesion stress between the filling part 15 and the heat dissipation layer 110b, so that in the process of removing the protective film layer 16 from the heat dissipation structure 11, each filling part 15 may be removed together with the protective film layer 16, as shown in FIG. 6, which improves the work efficiency.

In an embodiment of the present disclosure, the plurality of missing avoidance areas includes a first missing avoidance area 111a, a second missing avoidance area 111b, a third missing avoidance area 111c and a fourth missing avoidance area 111d, and the protective film layer 16 includes a first protective par 160, a second protective part 161 and a third protective part 162. The first protective part 160 completely covers the first missing avoidance area 111a, the second protective part 161 completely covers the second missing avoidance area 111b, and the third protective part 162 completely covers the third missing avoidance area 111c and the fourth missing avoidance area 111d.

In an embodiment of the present disclosure, in order to facilitate the removal of the first protective part 160, the second protective part 161 and the third protective part 162 from the heat dissipation structure 11, the first protective part 160, the second protective part 161 and the third protective part 162 may have a tearing handle 163 extended beyond the edge of the display panel 10, and the tearing handle 163 is of an integral structure with the protective part.

It should be noted that the protective film layer 16 may also be of a whole-surface structure as shown in FIG. 6, so that the whole protective film layer 16 and all the filling parts 15 may be removed from the heat dissipation structure 11 at once after the heat dissipation structure 11 has been adhered to the back side of the display panel 10.

Figure 4:
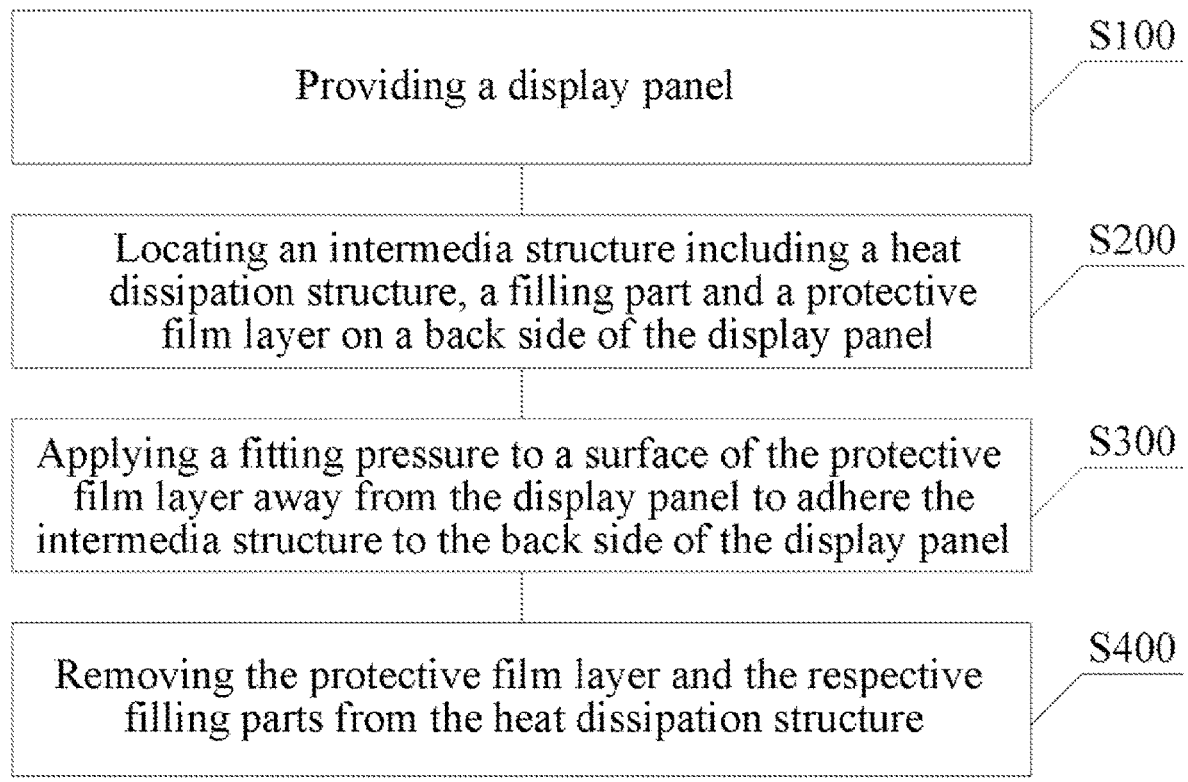
FIG. 4 illustrates a flow chat of a method for manufacturing a display module in an embodiment of the present disclosure.

An embodiment of the present disclosure also provides a method of manufacturing a display module in order to manufacture the module structure described in any of the preceding embodiments. As shown in FIG. 4, the method of manufacturing the display module may include the following steps.

In step S100, a display panel 10 is provided.

Figure 5:
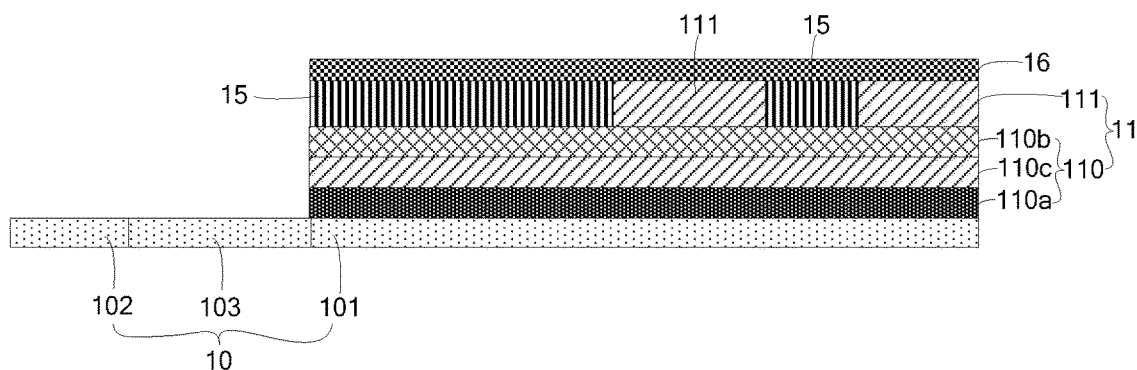
FIG. 5 illustrates a schematic diagram of a structure after completion of step S200 in an embodiment.

In step S200, a heat dissipation assembly is located on a back side of the display panel 10. The heat dissipation assembly includes a heat dissipation structure 11, a filling part 15 and a protective film layer 16. Specifically, the heat dissipation structure 11 may include an adhesive layer 110a, a first foam layer 110c disposed on a side of the adhesive layer 110a away from the display panel 10, a heat dissipation layer 110b disposed on a side of the first foam layer 110c away from the adhesive layer 110a, and a second foam layer 111 disposed on a side of the heat dissipation layer 110b away from the first foam layer 110c. The second foam layer 111 has a plurality of missing avoidance areas, and each missing avoidance area is filled with the filling part 15 adhered to the heat dissipation layer 110b. A plane of the filling part 15 away from the display panel 10 is flush with a plane of the second foam layer 111 away from the display panel 10. The protective film layer 16 is located on the sides of the filling part 15 and the second foam layer 111 away from the heat dissipation layer 110b and completely covers the heat dissipation structure 11. It should be noted that in an embodiment of the present disclosure, the filling part 15 is located in the missing avoidance area and is in seamless contact with the second foam layer 111, as shown in FIG. 5.

In step S300, a fitting pressure is applied to the surface of the protective film layer 16 away from the display panel 10 to adhere the heat dissipation assembly to the back side of the display panel 10. For example, a mechanism such as a roller may be used to apply a uniform fitting pressure to the protective film layer 16 to adhere the heat dissipation assembly to the back side of the display panel 10.

In step S400, the protective film layer 16 is removed from the heat dissipation structure 11 together with the respective filling parts 15.

In an embodiment of the present disclosure, prior to fitting the heat dissipation structure 11 with the display panel 10, the filling parts 15 are added to the respective missing avoidance areas of the second foam layer 111 in the heat dissipation structure 11 so that the whole side of the heat dissipation structure 11 away from the display panel 10 is of plane. In this way, during the process of fitting the heat dissipation assembly with the display panel 10, it is ensured that the force is uniform at each position to avoid the occurrence of the die marks generated during the fitting, which improve the product quality.

In addition, by fitting the protective film layer 16 on the sides of the heat dissipation structure 11 and the filling part 15 away from the display panel 10, the protective film layer 16 may protect the heat dissipation structure 11 from being damaged during the fitting of the heat dissipation assembly to the display panel 10.

Figure 7:
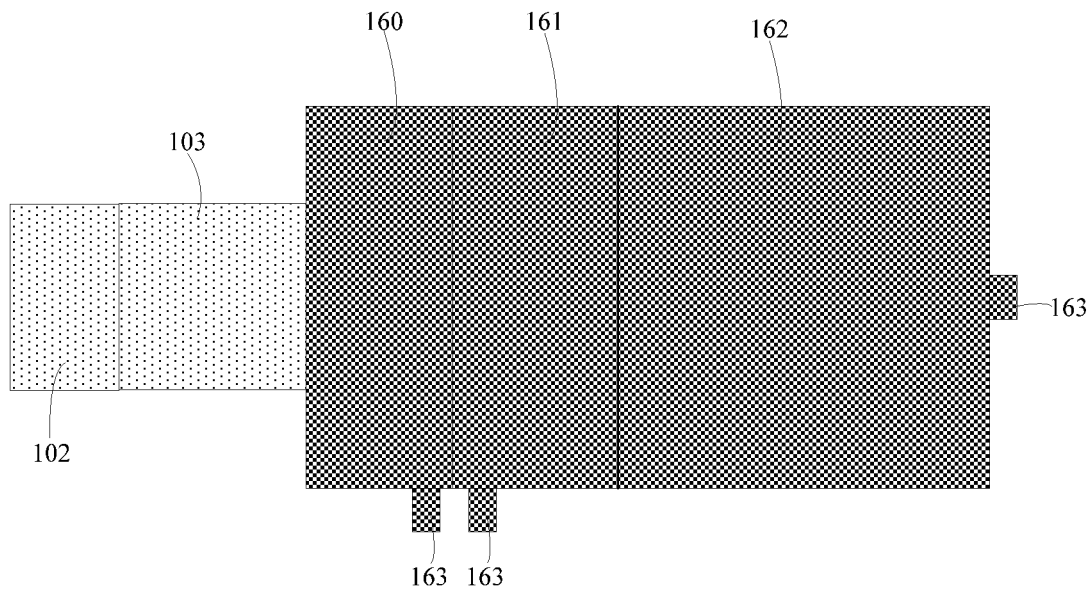
FIG. 7 illustrates a schematic plan view after completion of step S200 in another embodiment.

In an embodiment of the present disclosure, the display panel 10 may be flexible and includes a display part 101, a bonding part 102 and a bending part 103 connecting the display part 101 to the bonding part 102. Before the protective film layer 16 and each of the filling parts 15 are removed from the heat dissipation structure 11, the bending part 103 is flat as shown in FIG. 5. The heat dissipation assembly is fitted to the back side of the display part 101. As shown in FIG. 1, the plurality of missing avoidance areas may include a first missing avoidance area 111a, a second missing avoidance area 111b, a third missing avoidance area 111c and a fourth missing avoidance area 111d. As shown in FIG. 7, the protective film layer 16 includes a first protective part 160, a second protective part 161 and a third protective part 162, the first protective part 160 completely covers the first missing avoidance area 111a, the second protective part 161 completely covers the second missing avoidance area 111a, and the third protective part 162 completely covers the third missing avoidance area 111c and the fourth missing avoidance area 111d.

Figure 8:
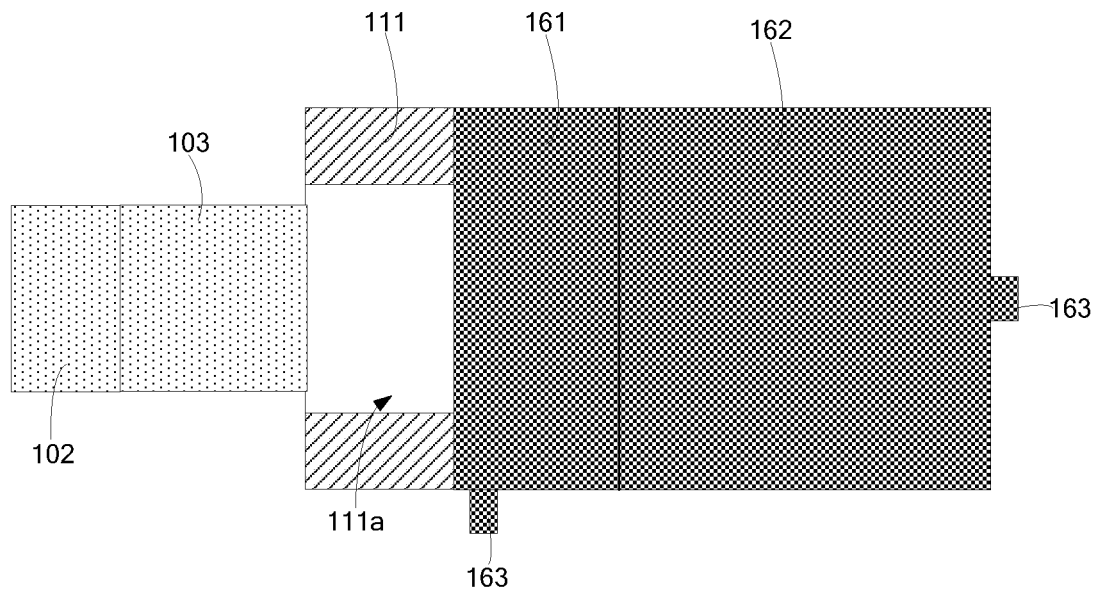
FIG. 8 illustrates a schematic plan view after completion of step S4001 in an embodiment.
Figure 9:
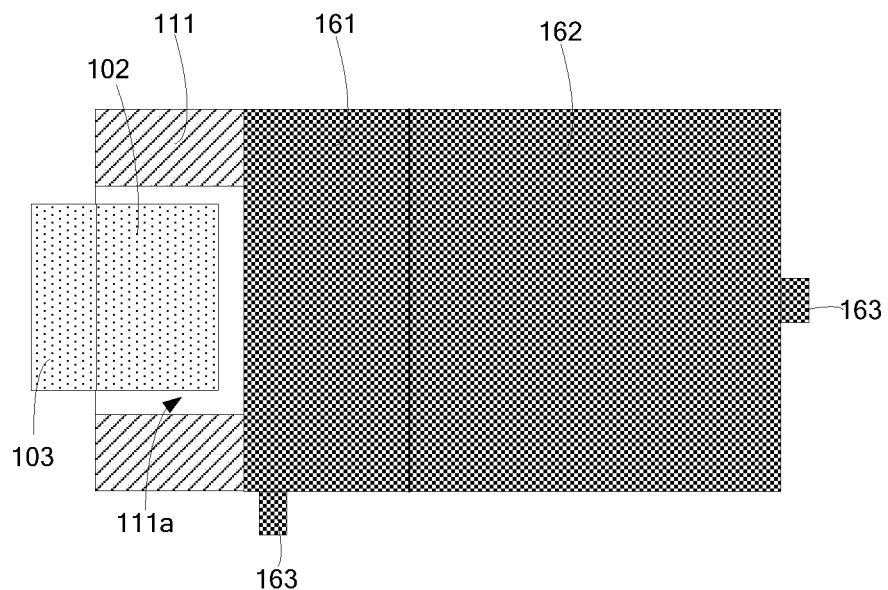
FIG. 9 illustrates a schematic plan view after completion of step S4003 in an embodiment.
Figure 10:
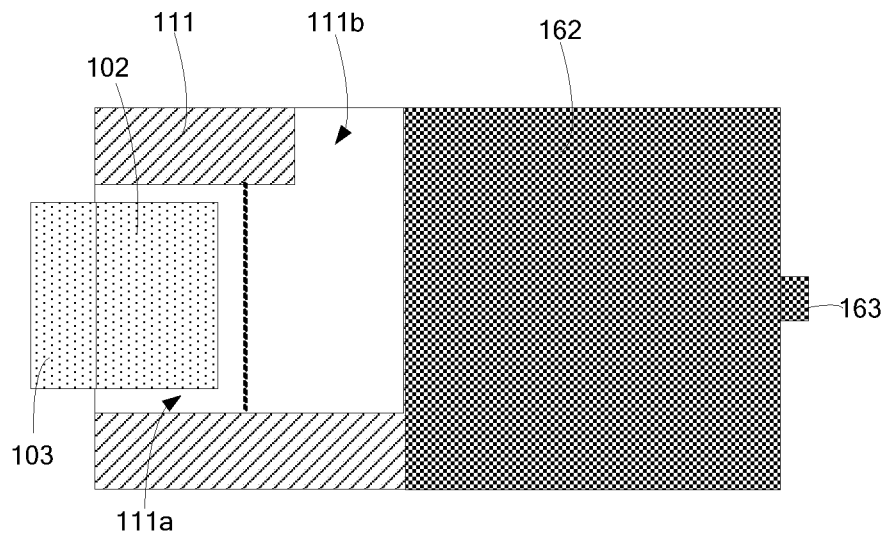
FIG. 10 illustrates a schematic plan view after completion of step S4005 in an embodiment.
Figure 11:
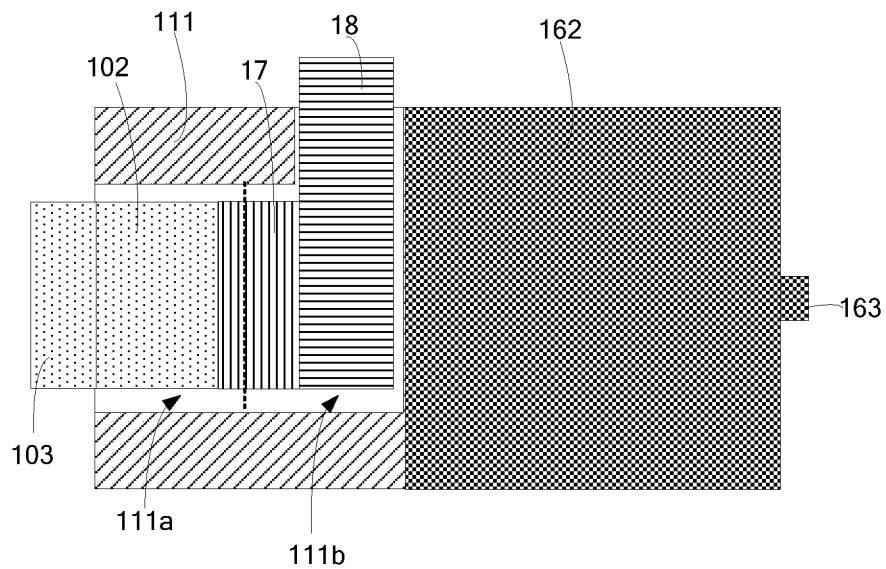
FIG. 11 illustrates a schematic plan view after completion of step S4007 in an embodiment.

Based on the aforementioned structure, removing the protective film layer 16 and the respective filling parts 15 from the heat dissipation structure 11 in step S400 may specifically include:
- step S4001, removing the first protective part 160 and the filling part 15 located in the first missing avoidance area 111a, as shown in FIG. 8;
- step S4003, bending the bonding part 102 onto the back side of the display part 101 and into the first missing avoidance area 111a, as shown in FIG. 9;
- step S4005, removing the second protective part 161 and the filling part 15 located in the second missing avoidance area 111b, as shown in FIG. 10;
- step S4007, electrically connecting a portion of the chip-on-film (COF) 17 to the bonding part 102 and another portion of the COF 17 to the main flexible circuit board 18 located in the second missing avoidance area 111b, as shown in FIG. 11; and
- step S4009, removing the third protective part 162 and the filling parts 15 located in the third missing avoidance area 111c and the fourth missing avoidance area 111d, as shown in FIG. 12.

In other words, in the embodiment, the protective film layer 16 is removed area by area. Specifically, the respective protective parts of the protective film layer 16 are removed one by one according to the order of processing, bonding and assembling of the actual product, so as to avoid the influence of the area formed first on the area formed later. For example, before bending the bonding part 102 onto the back side of the display part 101 and into the first missing avoidance area 111a, the first protective part 160 and the filling part 15 located in the first missing avoidance area 111a may be removed, and the second protective part 161 and the third protective part 162 remain, thus avoiding the tool used during the bending process from scratching the heat dissipation structure 11 located in the second protective part 161 and the third protective part 162, which improves the product quality.

Other embodiments of the present disclosure will be readily conceived of by those skilled in the art upon consideration of the specification and practice of the invention disclosed herein. The present disclosure is intended to cover any variations, uses or adaptations of the present disclosure that follow the general principles of the present disclosure and include the common knowledge or customary technical means in the art that are not disclosed herein. The specification and embodiments are to be considered exemplary only and the true scope and spirit of the present disclosure are indicated by the appended claims.

What is claimed is:

1. A display module, comprising:
   a display panel; and
   a heat dissipation structure, comprising an adhesive layer adhered to a back side of the display panel, a first foam layer located on a side of the adhesive layer away from the display panel, a heat dissipation layer located on a side of the first foam layer away from the adhesive layer, and a second foam layer located on a side of the heat dissipation layer away from the first foam layer,
   wherein the second foam layer has a plurality of missing avoidance areas.

2. The display module according to claim 1, wherein the heat dissipation layer comprises a metallic aluminum film and an RF shielding film, the metallic aluminum film has a first side away from the second foam layer and a second side close to the second foam layer, and the RF shielding film is disposed on at least one of the first side and the second side.

3. The display module according to claim 2, wherein the RF shielding film is disposed on the second side of the metallic aluminum film.

4. The display module according to claim 2, wherein the RF shielding film is a metallic nickel film.

5. The display module according to claim 2, wherein the heat dissipation layer has a thickness of 40 μm to 60 μm.

6. The display module according to claim 1, wherein the display panel is flexible and comprises a display part, a bonding part located on a back side of the display part and a bending part connecting the display part to the bonding part,
   wherein the adhesive layer is adhered to the back side of the display part, the plurality of missing avoidance areas comprise at least a first missing avoidance area, and the bonding part is located in the first missing avoidance area.

7. The display module according to claim 6, wherein
   the plurality of missing avoidance areas further comprises a second missing avoidance area, and the second missing avoidance area is contiguous with the first missing avoidance area,
   the display module further comprising a chip-on-film (COF) and a main flexible circuit board, the main flexible circuit board is located in the second missing avoidance area, a part of the COF is located in the first missing avoidance area and electrically connected to the bonding part, and another part of the COF is located in the second missing avoidance area and electrically connected to the main flexible circuit board.

8. The display module according to claim 7, wherein the plurality of missing avoidance areas further comprises a third missing avoidance area for accommodating a middle frame-grounded structure and a fourth missing avoidance area for accommodating a camera.

9. The display module according to claim 1, wherein a ratio between a of the second foam layer and a thickness of the heat dissipation structure is from 0.4 to 0.6.

10. The display module according to claim 9, wherein the thickness of the second foam layer is from 0.1 mm to 0.3 mm.

11. A heat dissipation assembly, comprising:
a heat dissipation structure, comprising an adhesive layer which can be adhered to a back side of a display panel, a first foam layer located on a side of the adhesive layer away from the display panel, a heat dissipation layer located on a side of the first foam layer away from the adhesive layer, and a second foam layer located on a side of the heat dissipation layer away from the first foam layer, wherein the second foam layer has a plurality of missing avoidance areas;
a plurality of filling parts, each filling in one of the missing avoidance areas, wherein the filling part is adhered to the heat dissipation layer, and a plane of the filling part away from the display panel is flush with a plane of the second foam layer away from the display panel; and
a protective film layer, located on a side of each of the second foam layer and the filling parts away from the heat dissipation layer and covering the heat dissipation structure.

12. The heat dissipation assembly according to claim 11, wherein the filling part has a same elastic modulus as the second foam layer.

13. The heat dissipation assembly according to claim 11, wherein the protective film layer is adhered to the filling part, and an adhesion stress between the protective film layer and the filling part is greater than an adhesion stress between the filling part and the heat dissipation layer.

14. The heat dissipation assembly according to claim 13, wherein
the plurality of missing avoidance areas comprises a first missing avoidance area, a second missing avoidance area, a third missing avoidance area and a fourth missing avoidance area, and
the protective film layer comprises a first protective part, a second protective part and a third protective part, the first protective part covers the first missing avoidance area, the second protective part covers the second missing avoidance area, and the third protective part covers the third missing avoidance area and the fourth missing avoidance area.

15. A display device, comprising
a middle frame structure, having a mounting plate and a side plate coupled to the mounting plate, the side plate and the mounting plate form a mounting groove by surrounding the mounting groove; and
a display module, mounted in the mounting groove, wherein the display module comprises:
a display panel; and
a heat dissipation structure, comprising an adhesive layer adhered to a back side of the display panel, a first foam layer located on a side of the adhesive layer away from the display panel, a heat dissipation layer located on a side of the first foam layer away from the adhesive layer, and a second foam layer located on a side of the heat dissipation layer away from the first foam layer,
wherein the second foam layer has a plurality of missing avoidance areas,
wherein the second foam layer is mounted to face the mounting plate.

16. The display device according to claim 15, wherein the heat dissipation layer comprises a metallic aluminum film and an RF shielding film, the metallic aluminum film has a first side away from the second foam layer and a second side close to the second foam layer, and the RF shielding film is disposed on at least one of the first side and the second side.

17. The display device according to claim 16, wherein the RF shielding film is disposed on the second side of the metallic aluminum film.

18. The display device according to claim 15, wherein the display panel is flexible and comprises a display part, a bonding part located on a back side of the display part and a bending part connecting the display part to the bonding part,
wherein the adhesive layer is adhered to the back side of the display part, the plurality of missing avoidance areas comprise at least a first missing avoidance area, and the bonding part is located in the first missing avoidance area.

19. The display device according to claim 18, wherein
the plurality of missing avoidance areas further comprises a second missing avoidance area, and the second missing avoidance area is contiguous with the first missing avoidance area,
the display module further comprising a chip-on-film (COF) and a main flexible circuit board, the main flexible circuit board is located in the second missing avoidance area, a part of the COF is located in the first missing avoidance area and electrically connected to the bonding part, and another part of the COF is located in the second missing avoidance area and electrically connected to the main flexible circuit board.

20. The display device according to claim 19, wherein the plurality of missing avoidance areas further comprises a third missing avoidance area for accommodating a middle frame-grounded structure and a fourth missing avoidance area for accommodating a camera.

* * * * *